United States Patent
Kerr et al.

(10) Patent No.: US 10,439,938 B2
(45) Date of Patent: *Oct. 8, 2019

(54) NETWORK PATH SELECTION BY CUSTOMER PREMISES EQUIPMENT

(71) Applicant: CenturyLink Intellectual Property LLC, Denver, CO (US)

(72) Inventors: Jade Kerr, Kansas City, MO (US); Clinton Smoyer, Raymore, CO (US); Andrew Cook, Sheldon, IA (US); Michael Morrissey, Overland Park, KS (US); Mohit Mathur, Charlotte, NC (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 1093 days.

This patent is subject to a terminal disclaimer.

(21) Appl. No.: 14/789,514

(22) Filed: Jul. 1, 2015

(65) Prior Publication Data

US 2015/0312152 A1 Oct. 29, 2015

Related U.S. Application Data

(63) Continuation of application No. 12/400,362, filed on Mar. 9, 2009, now Pat. No. 9,104,986.

(51) Int. Cl.
*H04L 12/66* (2006.01)
*H04L 12/801* (2013.01)
(Continued)

(52) U.S. Cl.
CPC .............. *H04L 47/10* (2013.01); *G06Q 10/04* (2013.01); *G06Q 30/0206* (2013.01);
(Continued)

(58) Field of Classification Search
CPC ........................ H04L 12/14; H04L 41/5038
(Continued)

(56) References Cited

U.S. PATENT DOCUMENTS

| | | |
|---|---|---|
| 5,048,011 A | 9/1991 | Melen |
| 6,055,571 A | 4/2000 | Fulp et al. |

(Continued)

FOREIGN PATENT DOCUMENTS

EP        1876766        1/2008

OTHER PUBLICATIONS

Yaiche, Haikel and Mazumdar, Ravi R., "A Game Theoretic Framework for Bandwidth Allocation and Pricing in Broadband Networks", Oct. 5, 2000, IEEE/ACM Transactions on networking, vol. 8, No. 5, pp. 667-678, 12 pages, (Year: 2000).*

(Continued)

*Primary Examiner* — Shannon S Campbell
*Assistant Examiner* — Freda A Nelson

(57) ABSTRACT

A system and method for providing a user of communications services with free market based pricing may include providing for communications over one of multiple network paths serviced by multiple respective communications service providers via at least one communications network. One of the network paths over which to communicate based on current pricing from the multiple communications service providers may be selected and communications may be performed over the selected network path.

20 Claims, 8 Drawing Sheets

(51) Int. Cl.
*H04L 12/14* (2006.01)
*G06Q 30/02* (2012.01)
*G06Q 10/04* (2012.01)
*H04L 29/06* (2006.01)

(52) U.S. Cl.
CPC .............. *H04L 12/14* (2013.01); *H04L 12/66* (2013.01); *H04L 69/24* (2013.01)

(58) Field of Classification Search
USPC ...... 705/7.31, 7.35, 400; 370/352, 322, 468, 370/248, 252
See application file for complete search history.

(56) References Cited

U.S. PATENT DOCUMENTS

| | | | |
|---|---|---|---|
| 6,104,701 A | 8/2000 | Avargues et al. | |
| 6,498,786 B1 | 12/2002 | Kirkby et al. | |
| 6,556,548 B1 | 4/2003 | Kirkby et al. | |
| 6,775,267 B1* | 8/2004 | Kung | H04L 12/14 370/352 |
| 6,842,780 B1 | 1/2005 | Frei et al. | |
| 7,283,477 B1 | 10/2007 | Fedyk et al. | |
| 7,577,154 B1 | 8/2009 | Yung et al. | |
| 7,668,966 B2 | 2/2010 | Klinker et al. | |
| 7,760,711 B1* | 7/2010 | Kung | H04L 12/14 370/352 |
| 7,965,673 B2 | 6/2011 | Iwamura | |
| 8,243,628 B2 | 8/2012 | Kerr et al. | |
| 8,412,822 B1 | 4/2013 | Weinman, Jr. | |
| 9,104,986 B2 | 8/2015 | Kerr et al. | |
| 9,118,490 B2 | 8/2015 | Kerr et al. | |
| 2002/0025798 A1 | 2/2002 | Titmuss et al. | |
| 2002/0120745 A1 | 8/2002 | Oishi et al. | |
| 2003/0229595 A1 | 12/2003 | Mononen et al. | |
| 2005/0159162 A1 | 7/2005 | Park | |
| 2006/0209891 A1 | 9/2006 | Yamada et al. | |
| 2007/0064607 A1 | 3/2007 | Moon et al. | |
| 2007/0094361 A1 | 4/2007 | Hoynowski et al. | |
| 2007/0299789 A1 | 12/2007 | Young | |
| 2008/0109343 A1 | 5/2008 | Robinson et al. | |
| 2008/0250137 A1 | 10/2008 | Zufelt | |
| 2008/0267189 A1 | 10/2008 | Li | |
| 2008/0273553 A1 | 11/2008 | Wang et al. | |
| 2008/0292075 A1 | 11/2008 | Pathos et al. | |
| 2008/0300890 A1 | 12/2008 | Dawson et al. | |
| 2009/0086643 A1* | 4/2009 | Kotrla | H04L 41/5038 370/248 |
| 2009/0147722 A1 | 6/2009 | Ramachandran | |
| 2009/0157443 A1 | 6/2009 | Gracieux | |
| 2010/0027560 A1* | 2/2010 | Yang | H04L 41/0896 370/468 |
| 2010/0080144 A1 | 4/2010 | Greenberg et al. | |
| 2010/0195540 A1 | 8/2010 | Kerr et al. | |
| 2010/0226254 A1 | 9/2010 | Kerr et al. | |
| 2012/0275302 A1 | 11/2012 | Kerr et al. | |

OTHER PUBLICATIONS

U.S. Appl. No. 12/363,507; Issue Notification dated Jul. 25, 2012; 1 page.
U.S. Appl. No. 12/363,507; Non-Final Rejection dated Dec. 30, 2011; 35 pages.
U.S. Appl. No. 12/363,507; Notice of Allowance dated Apr. 11, 2012; 29 pages.
U.S. Appl. No. 12/400,362; Final Rejection dated Nov. 25, 2011; 15 pages.
U.S. Appl. No. 12/400,362; Final Rejection dated Aug. 6, 2013; 25 pages.
U.S. Appl. No. 12/400,362; Issue Notification dated Jul. 22, 2015; 1 page.
U.S. Appl. No. 12/400,362; Non-Final Rejection dated Oct. 24, 2014; 18 pages.
U.S. Appl. No. 12/400,362; Non-Final Rejection dated Mar. 14, 2013; 26 pages.
U.S. Appl. No. 12/400,362; Non-Final Rejection dated Mar. 17, 2014; 31 pages.
U.S. Appl. No. 12/400,362; Non-Final Rejection dated Jun. 10, 2011; 18 pages.
U.S. Appl. No. 12/400,362; Notice of Allowance dated Mar. 30, 2015; 23 pages.
U.S. Appl. No. 13/542,293; Issue Notification dated Aug. 5, 2015; 1 page.
U.S. Appl. No. 13/542,293; Non-Final Rejection dated Sep. 17, 2014; 37 pages.
U.S. Appl. No. 13/542,293; Notice of Allowance dated Apr. 24, 2015; 19 pages.
Yaiche, Haikel and Mazumdar, Ravi R., "A Game Theoretic Framework for Bandwidth Allocation and Pricing in Broadband Networks", Oct. 5, 2000, IEEE/ACM Transactions on networking, vol. 8, No. 5, pp. 667-678, 12 pages.

* cited by examiner

NETWORK PATH SELECTION BY CUSTOMER PREMISES EQUIPMENT

CROSS REFERENCE TO RELATED APPLICATIONS

This application is a continuation of U.S. patent application Ser. No. 12/400,362, filed Mar. 9, 2009 by Kerr et al. and titled, "Customer Premise Equipment with Access to Free Market Based Pricing for Bandwidth on a Communications Network", which is hereby incorporated by reference in its entirety.

BACKGROUND

Communications networks, such as the Internet, have historically been built to meet peak bandwidth demands for users. Peak bandwidth demand typically occurs during business hours, as both businesses and consumers utilize bandwidth on communications networks. Developers of communications networks generally pay little attention to economics of developing a communications network. Potential revenue of a communications network is generally less important than providing sufficient bandwidth to handle peak communications to avoid frustrating customers. However, peak bandwidth occupancy is typically limited to a few hours during any given day, while the remainder of the day is significantly below the peak bandwidth occupancy. The end result is that the cost of constructing a communications network to satisfy the peak bandwidth occupancy during a few hours of any given day is difficult to justify. Therefore, an approach to lower peak bandwidth occupancy by encouraging users to send more traffic during less expensive bandwidth occupancy times and less traffic during more expensive bandwidth occupancy times would benefit communications networks service providers and users alike.

SUMMARY

To overcome the economic problems of communications networks, the principles of the present invention provide for customer premise equipment with access to free market pricing for bandwidth on multiple network paths on at least one communications network operated by multiple respective communications service providers. Bandwidth occupancy may be a parameter that is used by the communications service providers to adjust prices for users who use bandwidth of a communications network. Free market pricing is established by pricing for bandwidth to increase as bandwidth occupancy increases and to decrease as bandwidth occupancy decreases on a network path. Each communications service provider operating a network path to which customer premise equipment has access may "publish" or otherwise communicate correct prices of bandwidth to the customer premise equipment. The customer premise equipment may be configured to select a network path operated by a communications service provider with the lowest current prices for communicating over a communications network operated by a respective communications service provider.

One embodiment may include a customer premise equipment (CPE) for providing a customer of communications services with free market based pricing. The CPE may include an input/output (I/O) unit configured to communicate over multiple network paths serviced by multiple respective communications service providers via at least one communications network, and a memory. The processing unit may be in communication with the I/O unit and memory, and be configured to receive current pricing from the multiple communications service providers via the I/O unit for communicating over the multiple respective network paths, and select one of the network paths over which to communicate based on the current pricing.

One embodiment of a method for providing a user of communications services with free market based pricing may include providing for communications over one of multiple network paths serviced by multiple respective communications service providers via at least one communications network. One of the network paths over which to communicate based on current pricing from the multiple communications service providers may be selected and communications may be performed over the selected network path.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
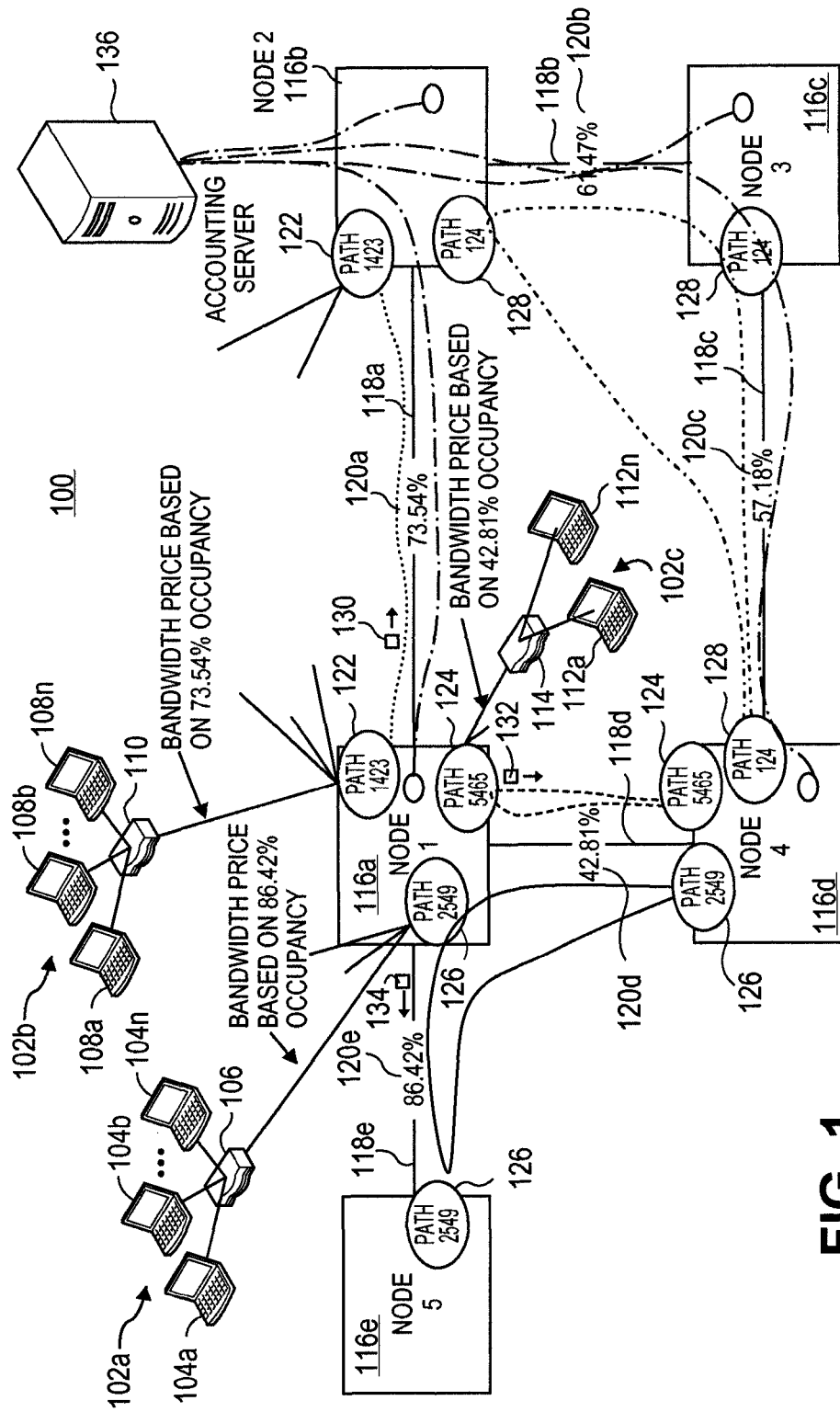
FIG. 1 is an illustration of an illustrative network environment in which supply and demand of bandwidth occupancy are utilized in determining pricing for usage of the communications network.

With regard to FIG. 1, an illustration of an illustrative network environment 100 is shown to include a number of users 102a-102c of the network environment 100. User 102a may include computing devices 104a-104n that interface with the network environment 100 via server 106. User 102b includes computing devices 108a-108n that interfaces with the network environment 100 via server 110. Similarly, user 102c includes computing devices 112a-112n that interface with the network environment 100 via a server 114. Each of the servers 106, 110, and 114 may be considered end-points of the network environment 100.

The network environment 100 illustratively includes five network nodes 116a-116e (collectively 116) that enable the users 102 to communicate with one another and with other users in communication with each of the nodes 116. Each of the nodes 116 are connected via links 118a-118e (collectively 118). Link 118a provides for communications between nodes 116a and 116b, link 118b provides for communications between nodes 116b and 116c, link 118c provides for communications between nodes 116c and 116d, link 118d provides for communications between nodes 116a and 116d, and link 118e provides for communications between nodes 116a and 116e. As shown, each of the links have a bandwidth occupancy 120a-120e, respectively, that is indicative of a percentage of bandwidth of a total bandwidth capacity that is currently being utilized along the links 118. For example, link 118a has a bandwidth occupancy 120a of 73.54%, and link 118d has a bandwidth occupancy 120d of 42.81% that is currently being utilized.

Each of the nodes 116 are shown to be operating or communicating along at least one traffic path with other network nodes 116. For example, node 116a is shown to be communicating along traffic paths 122, 124, and 126, where traffic path 122 includes nodes 116a and 116b, traffic path 124 includes nodes 116a and 116b, and traffic path 126 includes nodes 116a, 116d, and 116e. Another traffic path 128 includes nodes 116b, 116c, and 116d. Each of the traffic paths 122-128 are shown to span across at least one of the links 118. The bandwidth occupancies 120 of each of the links 118 establish bandwidth occupancy for each of the paths 122-128.

According to economic supply and demand principles, higher bandwidth occupancy means that there is less bandwidth supply along a link. Less bandwidth supply typically results in higher prices for use of network resources. As shown in the network environment 100, the bandwidth occupancy 120e at 86.42% is the highest bandwidth occupancy currently being used in the network environment 100. Because user 102a is operating over the traffic path 126 that includes link 118e with the bandwidth occupancy 120e at 86.42%, user 102a will be charged a higher price than users 102b and 102c, who are operating on traffic path 122 and 124, respectively, which both have lower bandwidth occupancy (i.e., 73.54% and 42.81%, respectively).

Each of the users 102 via end-points 106, 110, and 114 initially access network node 116a to access the network environment 100. As such, network node 116a may be considered a primary network node or edge node with respect to each of the users 102 as network node 116a is the edge of the network environment 100 from the point of view of each of the users 102. Being the primary network node for each of the users, the network node 116a may be configured to initiate a bandwidth occupancy query message to each of the other network nodes that are operating in the traffic paths 122, 124, and 126. As shown, network node 116a may communicate (i) bandwidth occupancy query message 130 along traffic path 122, (ii) bandwidth occupancy query message 132 to network node 116d along link 118d for traffic paths 124 and 126, and (iii) bandwidth occupancy query message 134 along link 118e for traffic path 126. The bandwidth occupancy query messages 130, 132, and 134 may be received by other network nodes, thereby causing the network nodes to look up or otherwise determine current bandwidth occupancy at the network node on each respective traffic path. Response messages (not shown) from the other network nodes may be communicated back to the primary network node 116a, as further described herein with respect to FIG. 2.

The primary network node 116a may calculate current prices for each user to communicate over the respective network paths and communicate the current prices to each respective user. The calculation of the current prices may be performed on a periodic basis (e.g., every second) and communicated to the user, thereby enabling the user to adjust network usage as desired. In one embodiment, the pricing information may be communicated to the user on a real time basis. In an alternative embodiment, the servers 106, 110, and 114 may pull current prices from the primary network node 116a as configured by the user (e.g., determine price for network usage every 15 minutes).

An accounting server 136 may be configured to be in communication with the network environment 100. The accounting server may be a centralized server that communicates with one network node, such as network node 116b, to be in communication with every other network node in the network environment 100. Alternatively, rather than utilizing a centralized accounting server, distributed accounting servers may be positioned in the network environment 100. For example, each network node may itself operate as an accounting server by executing a process that performs the same or similar functionality to determine current pricing of each traffic path being utilized by users 102 of the network environment 100. In accordance with the principles of the present invention, the accounting server 136 may be configured to collect network usage by users as determined by the network nodes 116, where the network nodes may continuously or periodically determine network usage and bandwidth occupancy, so as to determine cost for each of the users. The prices for communicating over each traffic path may be different based on the bandwidth occupancy of each respective traffic path. For example, the price for communicating along traffic path 126 may be higher for user 102a than for user 102b communicating over traffic path 122. The price may vary based on time usage, bandwidth usage, or any other parameter (e.g., quality of service (QoS) that a communications service provider may establish as being marketably price variant as applicable to users.

Figure 2:
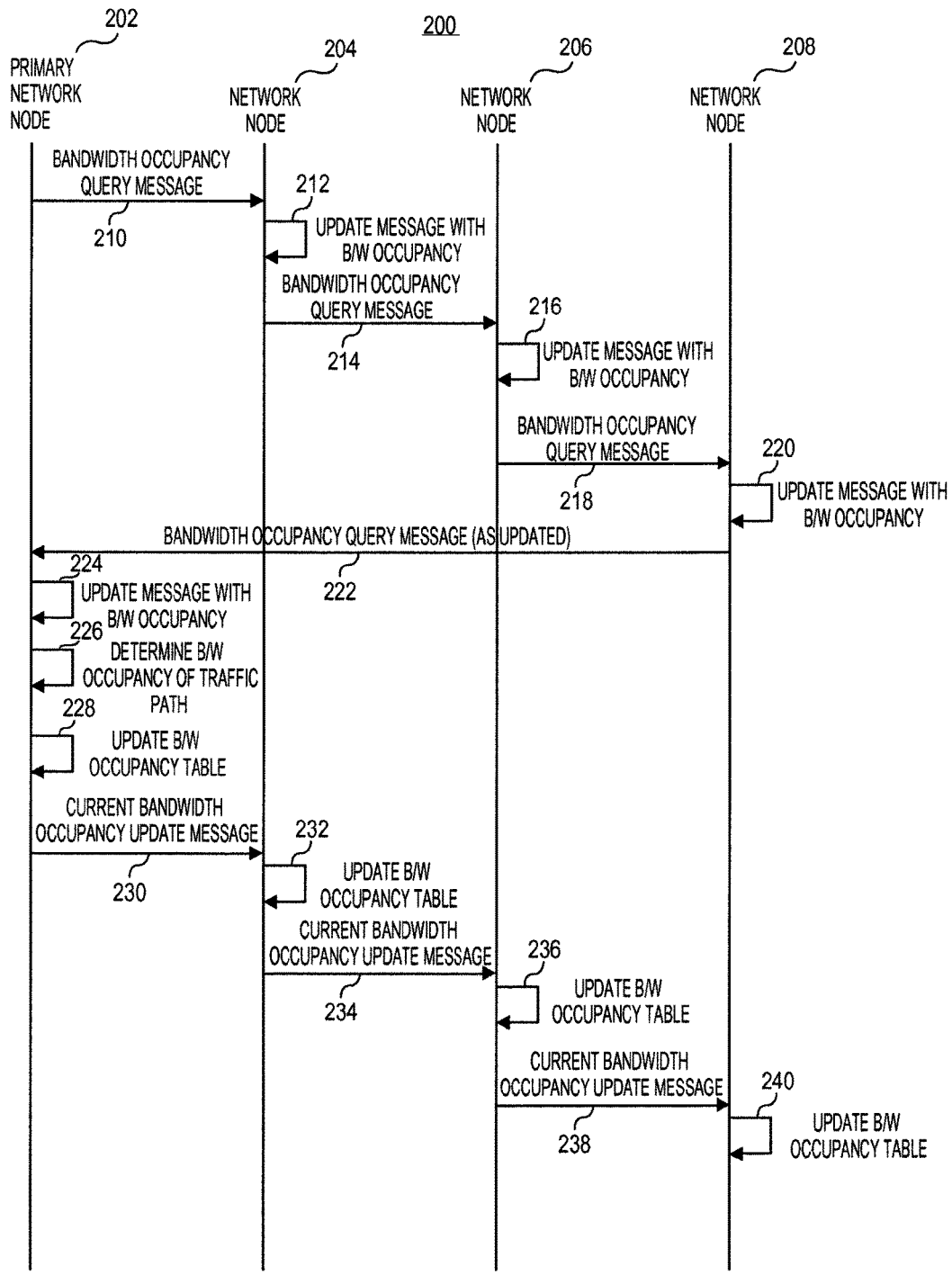
FIG. 2 is a flow diagram of an illustrative process for providing network occupancy communications.

With regard to FIG. 2, a sequence diagram shown in illustrative process 200 for collecting and managing bandwidth occupancy on a network is shown. The process 200 is shown to be performed between a primary network node 202 and other network nodes 204, 206, and 208 of a communications network. The primary network node 202 is an edge node that is generally in direct communication with an end-point of a user or in indirect contact with the end-point, but operates as a primary network node to facilitate communications over the network for the user.

The process 200 starts at step 210, where the primary network node 202 communicates a bandwidth occupancy query message 210 to the network node 204. The bandwidth occupancy query message 210 may request that the network node 204 determine its current bandwidth occupancy along a traffic path. The network node 204 may determine bandwidth occupancy on a port of the network node 204 that is part of the traffic path. At step 212, the network node 204 may update the message with current bandwidth occupancy. In updating the message, a content portion of the message may be updated with the current bandwidth occupancy. In one embodiment, the bandwidth occupancy is expressed as a percentage. At step 214, the network node 204 may communicate the bandwidth occupancy query message as updated to the network node 206, which is next in the traffic path over which a user is communicating. At step 216, the network node 206 updates the message with its bandwidth occupancy if the bandwidth occupancy at network node 206 is higher than the bandwidth occupancy of the network node 204. At step 218, the bandwidth occupancy query message is communicated from the network node 206 to the network node 208, as network node 208 is in the traffic path of the user's communication. At step 220, the network node 208 updates the message with its bandwidth occupancy if the bandwidth occupancy at network node 208 is higher than the bandwidth occupancy of either the network node 204 or network node 206.

At step 222, a bandwidth occupancy query message as updated by the network nodes 204, 206, and 208 is communicated to the primary network node 202 from network node 208. The primary network node 202, in response, determines its bandwidth occupancy and updates the message (i.e., the content of the message) if the bandwidth occupancy at the primary network node 202 is higher than the bandwidth occupancies at the network nodes 204, 206, and 208. At step 226, a determination of the bandwidth occupancy of the traffic path is made. In determining the bandwidth occupancy of the traffic path, the primary network node 202 examines the bandwidth occupancy of the bandwidth occupancy query message that was updated by the primary network node 202 and determines its current value, which is the highest value of each of the network nodes 202, 204, 206, and 208. In an alternative embodiment, rather than replacing the bandwidth occupancy in the bandwidth occupancy query message, each of the network nodes may simply append the bandwidth occupancy at each respective network node so that the bandwidth occupancy at each of the network nodes 202, 204, 206, and 208 are collected by the primary network node 202. In addition, each network node that updates the message may include a node ID or address, thereby enabling a network manager to determine which network nodes have high bandwidth occupancy.

At step 228, the primary network node 202 may update a bandwidth occupancy table. The bandwidth occupancy table may be updated by the bandwidth occupancy determined at step 226 to be associated with the traffic path that includes the network nodes 202, 204, 206, and 208.

TABLE I

| Traffic Path | Path Occupancy | Associated Interfaces | Primary Node |
|---|---|---|---|
| 122 | 73.54% | 1.1, 2.1, 7.4, 5.6 | 116a |
| 124 | 42.81% | 3.2, 2.5 | 116a |
| 126 | 86.42% | 1.18, 5.1, 3.7 | 116a |

As shown in TABLE I, each traffic path utilizes a highest path bandwidth occupancy to define bandwidth occupancy along a given traffic path. The associated interfaces represent interfaces to each of the network nodes. The primary nodes are those to which a user initially communicates. However, it should be understood that the primary nodes may alternatively be nodes that are not first nodes to which the users communicate, but rather nodes that are designated to be established as primary nodes.

Continuing with FIG. 2, at step 230, a current bandwidth occupancy update message is communicated from the primary node 202 to the network node 204. At step 232, the network node 204 may update a bandwidth occupancy table that resides at the network node 204. The bandwidth occupancy table at the network node 204 may be the same or similar to that as shown in TABLE I. At step 234, a current bandwidth occupancy update message is communicated or forwarded from the network node 204 to the network node 206. At step 236, the network node 206 updates a bandwidth occupancy table that resides at network node 206, which may be the same or similar to that configured on network node 204. At step 238, a current bandwidth occupancy update message may be communicated from the network node 206 to the network node 208, which, in turn, may update a bandwidth occupancy table at step 240 that resides on the network node 208.

Figure 3:
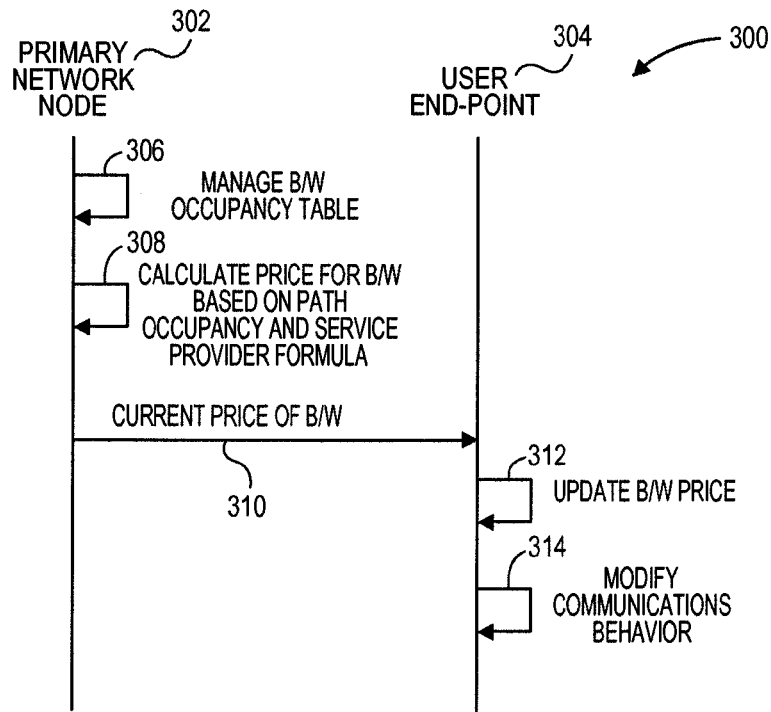
FIG. 3 is a flow diagram of an illustrative process for determining price for bandwidth for a user in accordance with the principles of the present invention.

With regard to FIG. 3, a sequence diagram showing an illustrative process 300 for determining price for bandwidth for a user is provided. The process 300 is shown to be performed by a primary network node 302 in communication with a user end-point 304. The process 300 starts at step 306, where the primary network node 302 is configured to manage a bandwidth occupancy table, such as bandwidth occupancy table shown in TABLE I. At step 308, the primary network node 302 may be configured to calculate a price for bandwidth based on path bandwidth occupancy and a service provider formula for determining price based on bandwidth occupancy. In calculating the price for the bandwidth, the price may be calculated every interval that the bandwidth occupancy is updated in the bandwidth occupancy table. For example, the bandwidth occupancy table may be updated every second or every five seconds and the price may be calculated at that time. Alternatively, the price may be calculated every 60 seconds to reduce processing at the primary network node 302.

At step 310, a current price of bandwidth may be communicated to the user end-point 304. The user end-point 304, in response, may update bandwidth price. In updating the bandwidth price, the user end-point 304 may display an updated price for communicating over a network for the user to view and/or update a software program that manages the user's communication operation over the network. At step 314, the user end-point may modify communications behavior over the network based on the updated bandwidth price. In one embodiment, the user may provision their user end-point 304 to slow down or stop non-real time communications traffic based on a bandwidth price that exceeds a predetermined threshold level (e.g., 75%). Other communications modifications may be performed automatically or semi-automatically based on bandwidth price. For example, a message to a user may automatically be displayed to notify the user of the current bandwidth charges and allow the user to select as to whether to continue with network communications, stop network communications, or slow down network communications. In one embodiment, the system may establish a highest bandwidth occupancy or price threshold at which point the communications may automatically be slowed down or stopped and a message may be communicated or otherwise displayed for a user of the bandwidth pricing and effects that are being implemented to reduce costs. By using supply and demand economics for changing pricing for use of bandwidth over a communications network, users who elect to change their communications during peak periods will reduce peak bandwidth over network nodes with high bandwidth occupancy, thereby reducing network needs to satisfy certain periods of time for peak bandwidth usage.

Figure 4:
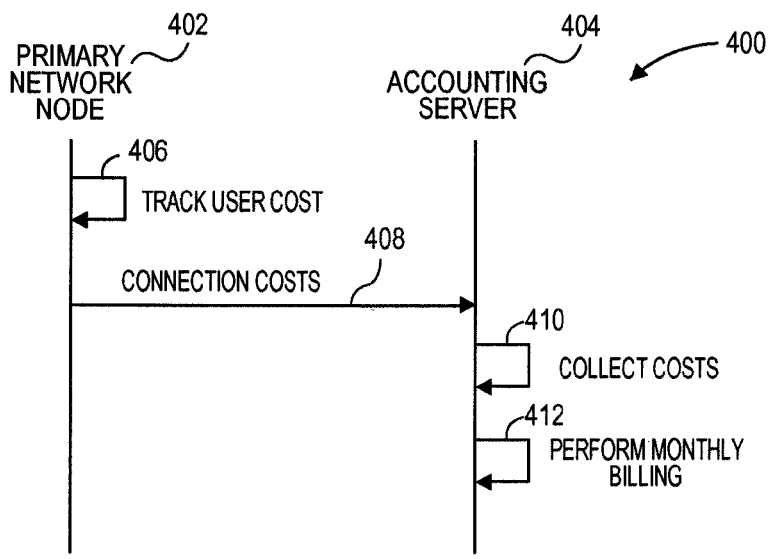
FIG. 4 is a flow diagram of an illustrative process for an accounting server operating on a communications network handling free market bandwidth accounting.

With regard to FIG. 4, a sequence diagram of an illustrative process 400 for billing users for communication over a communications network that uses supply and demand as a function of pricing is shown. A primary network node 402 and accounting server 404 are shown to be utilized in performing billing for network usage. The process 400 starts at step 406, where the primary network node 402 tracks user cost based on bandwidth occupancy. At step 408, the primary network node communicates user connection costs determined by the primary network node 402 to the accounting server 404. The connection costs may be collected by the primary network node 402 over a given time period and communicated to the accounting server 404 for that time period. The accounting server 404 may collect connection costs for each end-point for every user on the network and store the connection costs for billing purposes at step 410. At step 412, the accounting server 404 may perform monthly billing by accessing the collection costs stored for each user connected to each primary network node and issue bills in the form of paper or electronic bills to each user on the network serviced by a telecommunications service provider.

Figure 5:
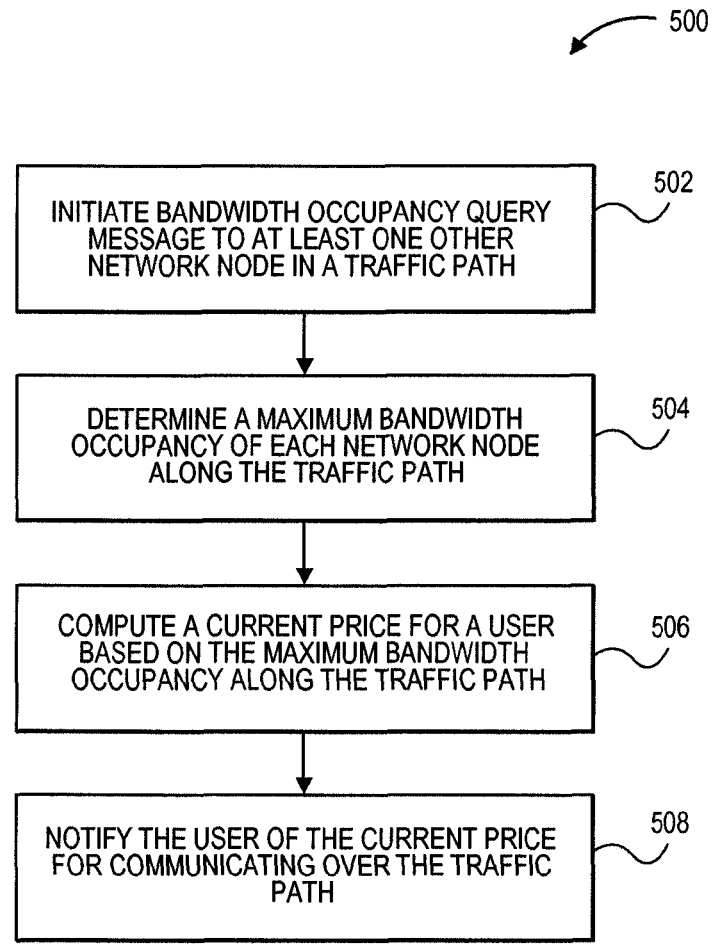
FIG. 5 is a flow diagram of an illustrative process for establishing a price for users communicating over a communications network.

With regard to FIG. 5, a flowchart of an illustrative process 500 for establishing a price for communicating over a communications network is provided. At step 502, a bandwidth occupancy query message may be initiated for communication to at least one other network node in a traffic path. The traffic path may be a communications path over which a user may be communicating information over a communications network, such as the Internet. At step 504, a highest bandwidth occupancy of the network nodes along the traffic path may be determined. In one embodiment, the determination may be made by receiving bandwidth occupancy from each of the network nodes along the traffic path and selecting the highest value. Alternatively, a single value may be received from the network nodes, where the single value is the highest bandwidth occupancy as determined by each of the network nodes. At step 506, a current price for a user may be computed based on the highest bandwidth occupancy along the traffic path. The current price is a current price for which the user is being charged to communicate over the traffic path. In one embodiment, the current price is established based on a formula (e.g., current price=(bandwidth occupancy/bandwidth capacity)*network usage rate) provided by a communications service provider of which the user is a customer. At step 508, the user may be notified of the current price for communicating over the traffic path. In one embodiment, notification of the current price may be in the form of dollars for bandwidth usage, current highest bandwidth occupancy, or any other parameter that may assist the user in determining whether to continue communicating over the traffic path or adjust current communications to reduce or increase communications based on the current price for communicating over the traffic path.

Figure 6:
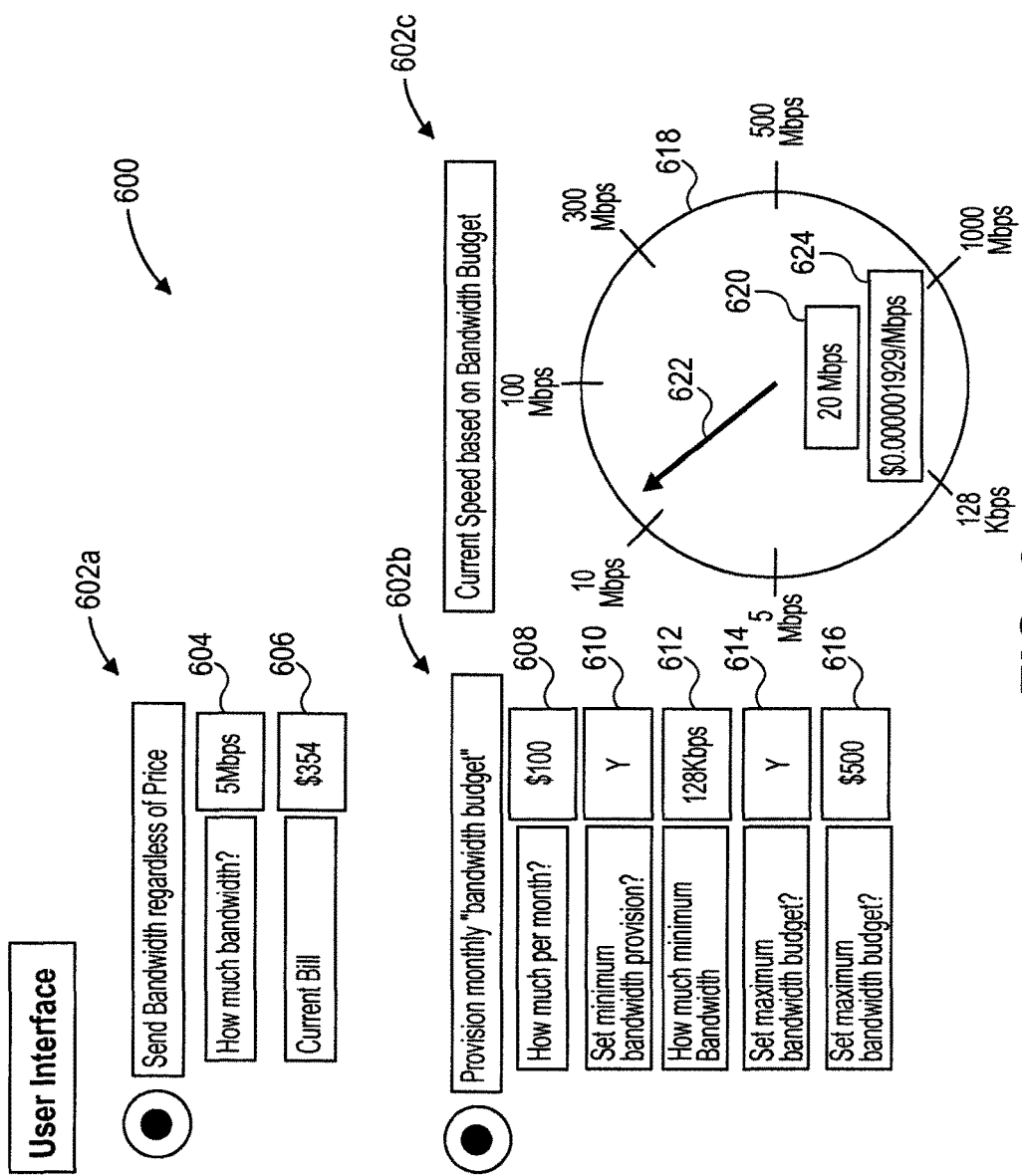
FIG. 6 is an illustration of an illustrative set of controls for a user for establishing and monitoring communications over a communications network that utilizes bandwidth occupancy in establishing a price for communicating over the communications network.

With regard to FIG. 6, an illustration of an illustrative graphical user interface 600 is provided. A graphical user interface 600 may include a number of different sections, including section 602a, 602b and 602c. Sections 602a and 602b are each selectable by a user to enable the user to selectively determine how communications over a communications network are to be conducted based on supply and demand of bandwidth occupancy that affects price being paid by the user. Section 602a enables the user to select that the user is going to communicate over the communications network regardless of price and to enable the user to indicate how much bandwidth is to be guaranteed as a minimum. In addition, a current bill for the user to perform communications over the communications network may be displayed. In one embodiment, the current bill is cumulative during a monthly period or billing cycle to enable the user to determine how much network access currently and/or cumulatively costs.

Section 602b enables a user to select to provision a monthly bandwidth budget. The user is able to enter a maximum amount of dollars per month to be spent for communicating over the communications network in a data field 608. The user may select whether or not to set a minimum bandwidth provision for communications over the communications network by entering a "Y" in data field 610, and if the user selects to have a minimum bandwidth provision, then the user may enter a minimum bandwidth provision by entering a value in the data field 612. The user may also elect to set a maximum bandwidth budget by entering a "Y" in data field 614, and, if so, then a maximum bandwidth budget may be set by the user by entering an amount in data field 616. It should be understood that each of the data fields 608-616 may be configured as selectable pull-down menus or utilize other graphical user elements as understood in the art for the user to select options and values for each of the bandwidth provisioning parameters.

Section 602c may include a current bandwidth speed dial 618 that includes a "digital" indicator 620 and "analog" indicator 622 that represent the amount of bandwidth currently being utilized by the user. In addition, another indicator 622 may show a current price for a megabit per second (Mbps) for communicating data over a communications network. An example of pricing may be given by the following example: if $100/month bandwidth budget is use and there are 2,592,000 seconds in an average month, the user has $0.00003858 to spend on bandwidth every second of the month ($100/2,592,000), so the current price of bandwidth would have to be $0.000001929/Mbps for a current communication speed of 20 Mpbs, as shown by the current bandwidth speed dial 618. It should be understood that alternative representations of indicating to the user the amount of bandwidth currently being utilized by the user and current costs for using bandwidth on or accessing the communications network. Different colors, popup windows, or other messaging may be utilized in section 602c to notify the user when costs are increasing at or near budgetary desires as established by the user. The user interface may be executed by software operating on a server, such as server 106 (FIG. 1), of the user and accessible by a computing device, such as computing device 104a, that interfaces with the server 106.

Figure 7:
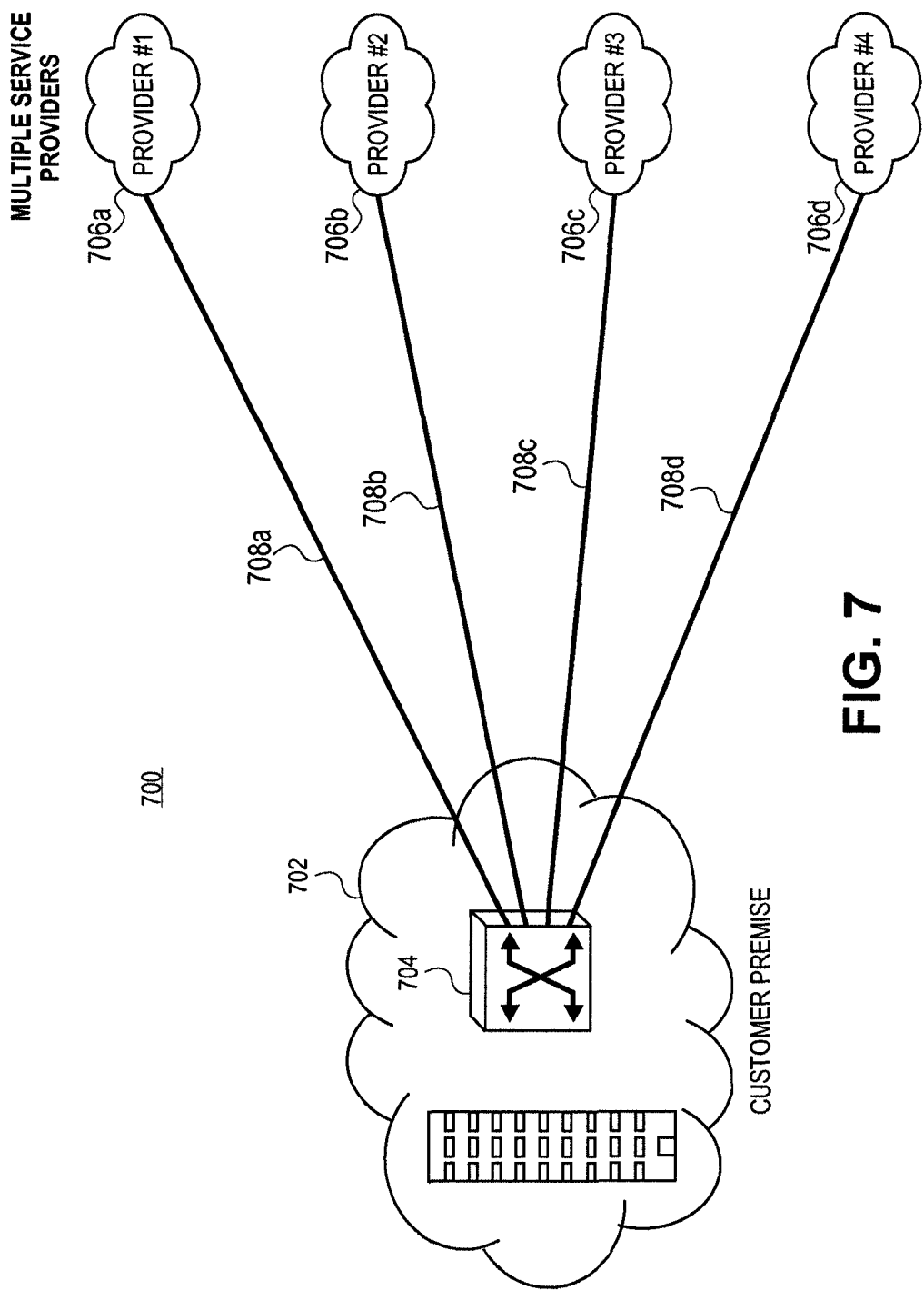
FIG. 7 is an illustration of an illustrative network environment in which multiple communications service providers are available for a user to access at least one communications network.

With regard to FIG. 7, an illustration of an illustrative network environment 700 is shown to include a network 702 in which a customer premise equipment (CPE) 704 is shown to be in communication with multiple communications service providers 706a-706d (collectively 706). The CPE 704 may be a computer system, such as a server, configured to operate as a switch or other communications network device, as understood in the art. The CPE 704 may be in communication with the service providers 706 via network or traffic paths 708a-708d (collectively 708), respectively. The network paths 708 may be hardwired, such as the public switched telephone network (PSTN) or fiber optic cables, or wireless, such as cellular or satellite communications links.

Each of the network paths 708 may be on the same or different communications network. The communications networks may be the PSTN, Internet, or any other communications network.

Figure 8:
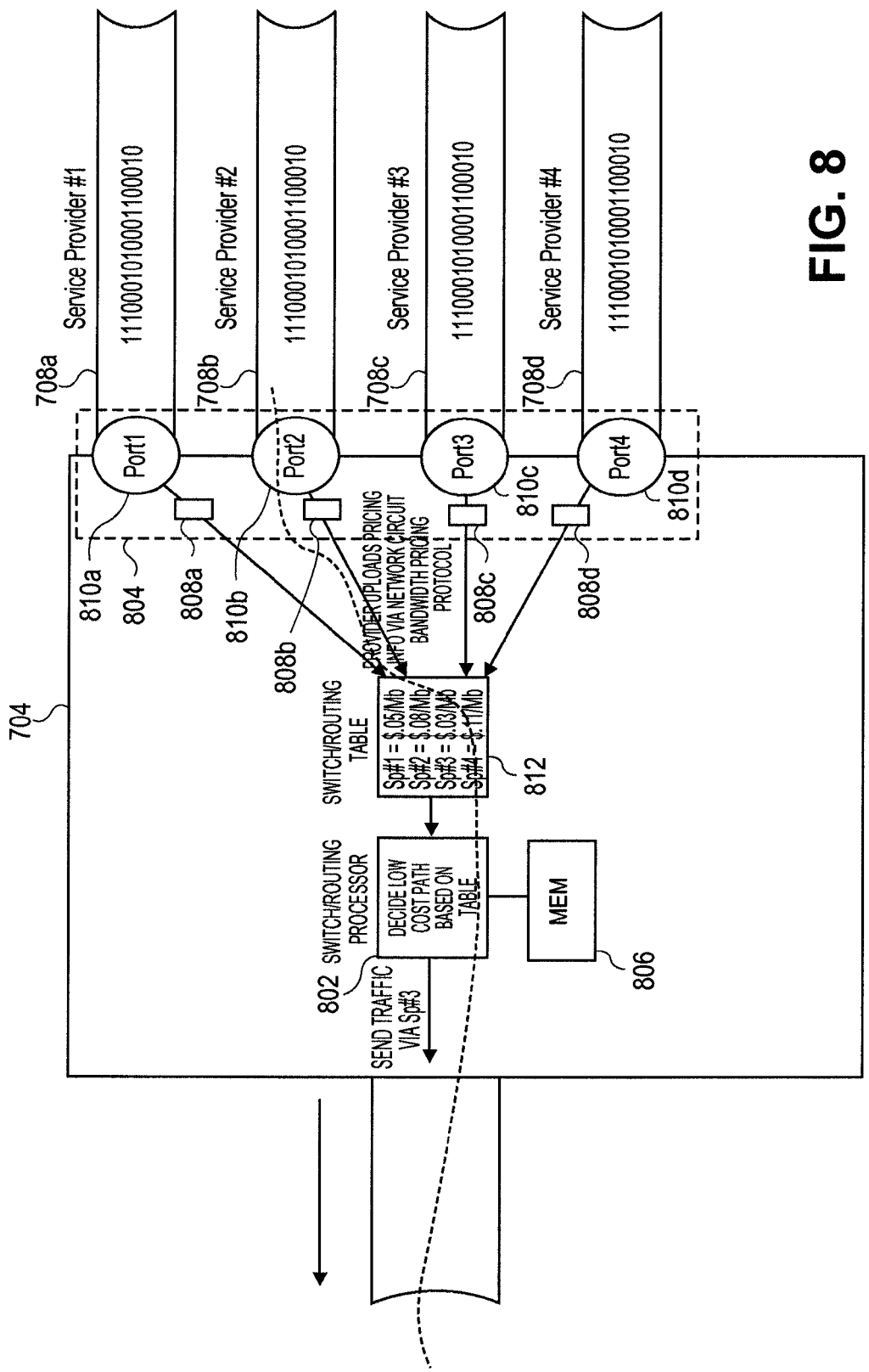
FIG. 8 is an illustration of an illustrative customer premise equipment configured to communicate with network paths of multiple communications service providers.

With regard to FIG. 8, the CPE 704 may be configured with a processing unit 802 that executes software that is configured to cause the processing unit 802 to use logic to determine which of the network paths 708 over which to communicate. The processing unit 802 may be in communication with input/output (I/O) unit 804 and memory 806. The I/O unit 804 may be configured with communications circuits 808*a*-808*d* (collectively 808). Each of the communications circuits 808 may be configured to enable the CPE 704 to communicate over respective network paths 708 serviced by respective communications service providers. Each of the communications circuits 808 may be in communication with or may be part of ports 810*a*-810*d* (collectively 810) that interface with the network paths 708.

The processing unit 802 further may be in communication with a routing table 812 that may be part of the processing unit 802. In one embodiment, the routing table 812 is stored in memory 806. The routing table 812 may be configured to receive current pricing of network bandwidth usage by a user of the CPE 704. In an alternative embodiment, the CPE 704 may be configured to access the pricing published and posted on the communications network(s). The current pricing may be stored in the memory 806 and accessed by the processing unit 802 to determine which of the network paths 708 to select to communicate. In one embodiment, the processing unit 802 may be configured to select the network path that has the lowest price for bandwidth usage. In another embodiment, the processing unit 802 may use the pricing as one factor in selecting the network paths over which to communicate. Other factors may include the particular communications service provider, agreement terms with the communications service provider, quality of service (QoS) provided by the communications service provider, and other factors.

Figures 9, 10:
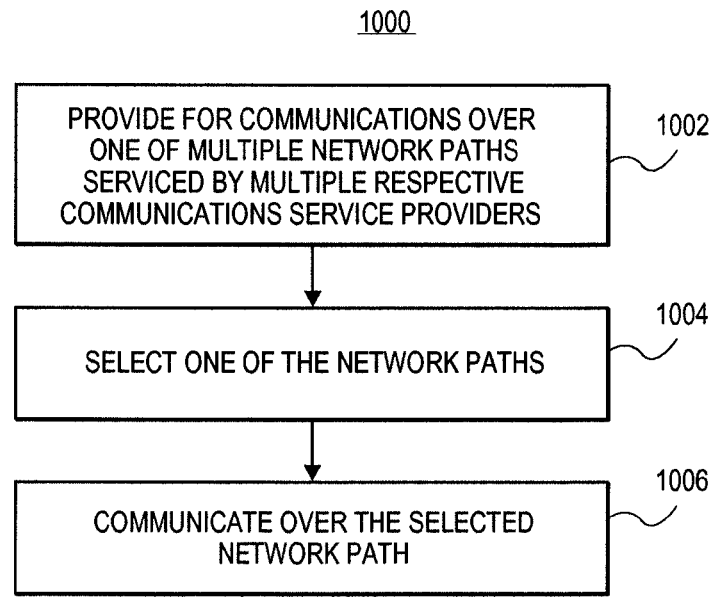
FIG. 9 is a screen shot of an illustrative graphical user interface configured to enable a user to establish settings of a customer premise equipment.
FIG. 10 is a flow chart of an illustrative process for providing a customer of communications services with free market based pricing.

With regard to FIG. 9, a screen shot of an illustrative graphical user interface (GUI) 900 is provided to enable a user of a CPE to set up operational parameters of the CPE to provide the user with market based pricing for bandwidth usage offered by multiple communications providers. The GUI 900 may include a list 902 of service providers that enables the user to select one or more communications service providers with which the CPE is configured to communicate and receive current pricing for bandwidth usage on at least one communications network. A selectable time GUI element 904 for the CPE to check bandwidth prices on a period basis (i.e., minimum period time) may be provided to the user. In one embodiment, the time increments may be set at 15, 30, 60, 120, or day minutes. If at the selected time increment it is determined that a communications service provider is offering bandwidth usage below a communications service provider that the user is currently using, then the CPE may select to switch communications with the lowest price communications service provider. In one embodiment, the CPE may be configured to switch if a minimum percentage, such as 10%, differential exists between the bandwidth pricing. It should be understood that the time increments may be set to continuous so that every time that bandwidth pricing changes by the communications service providers (e.g., every second), that the CPE may examine the current pricing and select the communication carrier delivering the lowest price.

In addition to selecting when the CPE is to determine current pricing for bandwidth, the GUI 900 may be configured to select a rule by which the CPE is to function in selecting a communications carrier to communicate over the respective communications carriers' network. Two rules 906 are selectable, (i) a select lowest bandwidth price rule, and (ii) a select highest quality of service (QoS) then the lowest bandwidth price rule. If a user has particularly sensitive or important data to communicate, the user may wish to select the second rule to ensure high QoS. Other rules governing selection of a communications service provider with which to provide communications services at the selected time intervals may be available for selection, as well.

Selectable options 908 for the CPE to handle non-real time communications sessions may be provided to the user for selection. Non-real time communications sessions are those that are not real time, such as telephone or video conferencing communications where people are actively communicating with one another. For example, non-real time communications sessions may include email, online access, or any other activity that a user may utilize the CPE to communicate over a communications network. If the user selects "immediately" to switch communicating, the CPE will switch communicating non-real time sessions from a first communications service provider to a second communications service provider. Otherwise, switching will occur after a communications session is complete (e.g., after user completes downloading a movie). Selection may be based on price sensitivity and communications speed desired by the user, as switching between communications service providers may delay download time.

Another set of selectable elements 910 may include minimum bandwidth that the user is willing to accept. The set 910 may be discrete or a text entry field or other GUI element (not shown) may enable the user to enter a minimum bandwidth. The CPE may verify that the minimum bandwidth for the current price of bandwidth is available before switching to a different communications service provider.

With regard to FIG. 10, a flow chart 1000 is provided to provide a user of a CPE with free market-based pricing. The process 1000 starts at step 1002, where a CPE is provided for communications over one of multiple network paths serviced by multiple respective communications service providers. In providing for the communications, multiple communications circuits may be installed in the CPE. The communications circuits may be configured to enable communications with different communications service providers. For example each communications circuits may be configured to store or otherwise recognize certain passcodes or other information communicated from a particular communications service provider. The communications network (s) may be different communications networks (e.g., distinct mobile telephone network) or the same communications network (e.g., the Internet). Different network paths may be provided by different service providers over the same communications network.

At step 1004, one of the network paths may be selected. In selecting the network path, the selection may be made based on current price of bandwidth being offered by each communications service provider, where the current prices may be communicated to the CPE by each communications service provider to enable the CPE to decide which network path to select. Selection may be made based on rules established by a user of the CPE. In one embodiment, the rules may dictate to the CPE to base selection on price (the lower the better) and QoS (the higher the better). At step 1006, the CPE may communicate over the selected network path. The CPE may provide for substantially seamless switching between network paths, where a substantially seamless switch may include a slight delay in communications, but cause no loss of data.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method of determining a network path for communication for a customer premise equipment (CPE), the method comprising:
   receiving, at the CPE, network information for each of a plurality of network paths between the CPE and the Internet, the network information comprising respective bandwidth occupancy information, and respective quality of service information;
   receiving, with the CPE, one or more user preferences indicating a minimum bandwidth for a selected network path;
   selecting, with the CPE the selected network path from the plurality of network paths based, at least in part, on bandwidth occupancy of the selected network path and a determination that the selected network path provides at least the minimum bandwidth;
   switching, via the CPE, communications from a first network path of the plurality of network paths to the selected network path responsive to a determination that the selected network path provides at least one of a higher quality of service or lower bandwidth occupancy than the first network path; and
   communicating, by the CPE, over the selected network path.

2. The method of claim 1, further comprising:
   periodically receiving, at the CPE, updated network information for at least some of the plurality of network paths;
   selecting, with the CPE, a different network path, based on the updated network information and the one or more user preferences, a different network path; and
   communicating, by the CPE, over the different network path.

3. The method of claim 1, wherein at least two of the plurality of network paths are operated by different communication service providers.

4. The method of claim 1, wherein the network information is collected by a primary network node on each of the network paths, and wherein the network information is collected by a message sent by the primary node requesting network information from a plurality of successive nodes in the network path of the primary node, each successive node appending network information to the request message before the request message is returned to the primary node.

5. The method of claim 1, wherein the one or more user preferences comprise one or more rules specifying how the CPE should select a network path.

6. The method of claim 5, wherein one or more rules comprise a rule specifying that the CPE should select a network path with a highest quality of service.

7. The method of claim 5, wherein the one or more rules include a rule that specifies maintaining communications over a network path for a minimum period of time.

8. The method of claim 5, further comprising, providing, with the CPE, a graphical user interface to establish rules for selecting a network path.

9. The method of claim 1, further comprising:
   determining whether any existing communications session being performed over the selected network path is a real time communications session;
   in response to determining that an existing communications session is a real time communications session, maintaining communications of the existing real time communications session over the selected network path; and
   in response to determining that an existing communications session is a non-real time communications session, switching the non-real time communications session to communicating over a different network path.

10. The method of claim 1, wherein the CPE is a router at the customer premises.

11. A customer premise equipment (CPE) comprising:
    a memory;
    a processing unit in communication with the memory, the processing unit configured to:
      receive network information for each of a plurality of network paths between the CPE and the Internet, the network information comprising respective bandwidth occupancy information, and respective quality of service information;
      receive one or more user preferences indicating a minimum bandwidth for a selected network path;
      select one of the plurality of network paths as the selected network path based, at least in part, on bandwidth occupancy of the selected network path and a determination that the selected network path provides at least the minimum bandwidth;
      switch communications from a first network path of the plurality of network paths to the selected network path responsive to a determination that the selected network path provides at least one of a higher quality of service or lower bandwidth occupancy than the first network path; and
      communicate over the selected network path.

12. The CPE of claim 11, wherein the processing unit is further configured to:
    periodically receive updated network information for at least some of the plurality of network paths;
    select a different network path, based on the updated network information and the one or more user preferences, a different network path; and
    communicate by the CPE, over the different network path.

13. The CPE of claim 11, wherein at least two of the plurality of network paths are operated by different communication service providers.

14. The CPE of claim 11, wherein the network information is collected by a primary network node on each of the network paths, and wherein the network information is collected by a message sent by the primary node requesting network information from a plurality of successive nodes in the network path of the primary node, each successive node appending network information to the request message before the request message is returned to the primary node.

15. The CPE of claim 11, wherein the one or more user preferences comprise one or more rules specifying how the CPE should select a network path.

16. The CPE of claim 15, wherein one or more rules comprise a rule specifying that the CPE should select a network path with a highest quality of service.

17. The CPE of claim 15, wherein the one or more rules include a rule that specifies maintaining communications over a network path for a minimum period of time.

18. The CPE of claim 15, wherein the processing unit is further configured to a graphical user interface to establish rules for selecting a network path.

19. The CPE of claim 11, wherein the processing unit is further configured to:
    determine whether any existing communications session being performed over the selected network path is a real time communications session;
    in response to determining that an existing communications session is a real time communications session, maintain communications of the existing real time communications session over the selected network path; and in response to determining that an existing communications session is a non-real time communications session, switch the non-real time communications session to communicating over a different network path.

20. The CPE of claim 11, wherein the CPE is a router at the customer premises.

\* \* \* \* \*